United States Patent
Temblador

(10) Patent No.: US 12,040,108 B2
(45) Date of Patent: Jul. 16, 2024

(54) FLEXIBLE CABLE WITH STRUCTURALLY ENHANCED CONDUCTORS

(71) Applicant: SOUTHWIRE COMPANY, LLC, Carrollton, GA (US)

(72) Inventor: Richard Temblador, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 17/498,414

(22) Filed: Oct. 11, 2021

(65) Prior Publication Data

US 2022/0029393 A1 Jan. 27, 2022

Related U.S. Application Data

(60) Division of application No. 16/442,874, filed on Jun. 17, 2019, now Pat. No. 11,145,433, which is a continuation of application No. 12/792,642, filed on Jun. 2, 2010, now Pat. No. 10,325,696.

(51) Int. Cl.
| | |
|---|---|
| H01B 7/18 | (2006.01) |
| H01B 13/14 | (2006.01) |
| H02G 1/12 | (2006.01) |
| H01B 9/02 | (2006.01) |
| H02G 1/00 | (2006.01) |

(52) U.S. Cl.
CPC ........... *H01B 7/189* (2013.01); *H01B 13/148* (2013.01); *H02G 1/1217* (2013.01); *H02G 1/1239* (2013.01); *H02G 1/1297* (2013.01); *H01B 9/028* (2013.01); *H02G 1/005* (2013.01); *Y10T 29/49117* (2015.01)

(58) Field of Classification Search
CPC ........ H01B 9/028; H01B 7/0869; H01B 7/17; H01B 7/18; H01B 7/189; H01B 7/20; H01B 7/24; H01B 7/228; H01B 13/148; Y10T 29/4917
USPC ............. 174/105 R, 110 R, 113 C, 98, 99 R, 174/102 P, 103, 107, 102 D
See application file for complete search history.

(56) References Cited

U.S. PATENT DOCUMENTS

| | | | | |
|---|---|---|---|---|
| 1,782,787 | A * | 11/1930 | McAuliffe | H01B 9/028 174/109 |
| 7,749,024 | B2 * | 7/2010 | Chambers | H01B 3/445 439/604 |
| 10,325,696 | B2 * | 6/2019 | Temblador | H01B 13/148 |
| 11,145,433 | B2 * | 10/2021 | Temblador | H01B 7/189 |
| 2006/0065430 | A1 * | 3/2006 | Kummer | H01B 13/145 174/120 R |
| 2007/0243761 | A1 * | 10/2007 | Chambers | C08K 5/20 439/587 |
| 2009/0250238 | A1 * | 10/2009 | Picard | H01B 9/028 174/103 |

* cited by examiner

*Primary Examiner* — Roshn K Varghese
(74) *Attorney, Agent, or Firm* — Merchant & Gould P.C.

(57) ABSTRACT

In an electrical cable of the type having an outer sheath enclosing a conductor assembly comprising a plurality of insulated conductors disposed within a binder, the binder having a crush resistance for protecting the insulated conductors, an improvement in which a strength enhancer is applied such that the binder can be removed without decreasing a crush resistance of the electrical cable.

18 Claims, 2 Drawing Sheets

FLEXIBLE CABLE WITH STRUCTURALLY ENHANCED CONDUCTORS

CROSS REFERENCE TO RELATED APPLICATIONS

This application is a divisional application of U.S. patent application Ser. No. 16/442,874, filed on Jun. 17, 2019, now U.S. Pat. No. 11,454,433, which is a continuation of U.S. patent application Ser. No. 12/792,642, filed Jun. 2, 2010, the contents of which are incorporated herein by reference in their entirety.

BACKGROUND

Metal-clad cables having a metal sheath potentially provide a low impedance and reliable ground path in order to function as an equipment grounding conductor. One type of such cable described in U.S. Pat. No. 6,486,395, assigned to the assignee of the present invention, contains a conductor assembly having at least two electrically insulated conductors cabled together longitudinally into a bundle and enclosed within a binder/cover. A bare grounding conductor is cabled externally over the binder/cover, preferably within a trough/interstice formed between the insulated conductors. In one type of metal-clad cable, the metal sheath is helically applied to form an interlocked armor sheath around the conductor assembly, and the bare grounding conductor is adapted to contact the sheath to provide the low impedance ground path.

However, in order to maximize the structural integrity of these and other types of cables, it is important that the conductors disposed within the metal clad cable be configured to withstand the various forces exerted on the cable during manufacturing, storage and/or installation. One solution is to enclose the conductors within the binder or cover to provide additional stability to the conductors disposed therein, especially additional strength against crushing forces. Another solution includes providing a talc powder around the conductors and beneath the binder/cover, providing a talc powder between the binder/cover and outer sheath and/or wrapping a Teflon wrap around each conductor (and talc, if present) prior to applying the binder/cover, in order to improve abrasion resistance, especially during flexing of the cable. However, cables having such configurations are costly to manufacture and can complicate manufacturing and field installation. For example, when terminating a cable, the binder/cover and Teflon wrap oftentimes remain exposed and must be separately cut or peeled away from the conductor assembly. This results in increased unnecessary material waste and increased labor costs.

SUMMARY

Embodiments provided herein contain an improved electrical cable of the type having an outer sheath enclosing a conductor assembly. The conductor assembly comprises a plurality of insulated conductors with a strength enhancer to provide increased resistance against crushing forces thereby obviating the need for a binder/cover disposed around the conductor assembly. According to embodiments disclosed herein, the strength enhancer may include a silicone oil, an erucamide and/or generally increasing the thickness of the conductor insulation such that, for example, the cable conforms to the performance criteria established by UL 1569.

In addition, embodiments provided herein include a method of increasing crush resistance of an electrical cable having an outer sheath enclosing a conductor assembly. In particular, methods disclosed herein provide for insulating one or more conductors, wherein insulating the one or more conductors includes providing a strength enhancer within the insulation and enclosing the insulated conductors with the outer sheath, wherein the electrical cable has increased crushed resistance without the need for a binder/cover.

BRIEF DESCRIPTION OF THE DRAWINGS

For a more complete understanding of the present invention, including additional features, objects and advantages thereof, reference is now made to the following detailed description, taken in conjunction with the drawings, in which.

DETAILED DESCRIPTION

Figure 1:
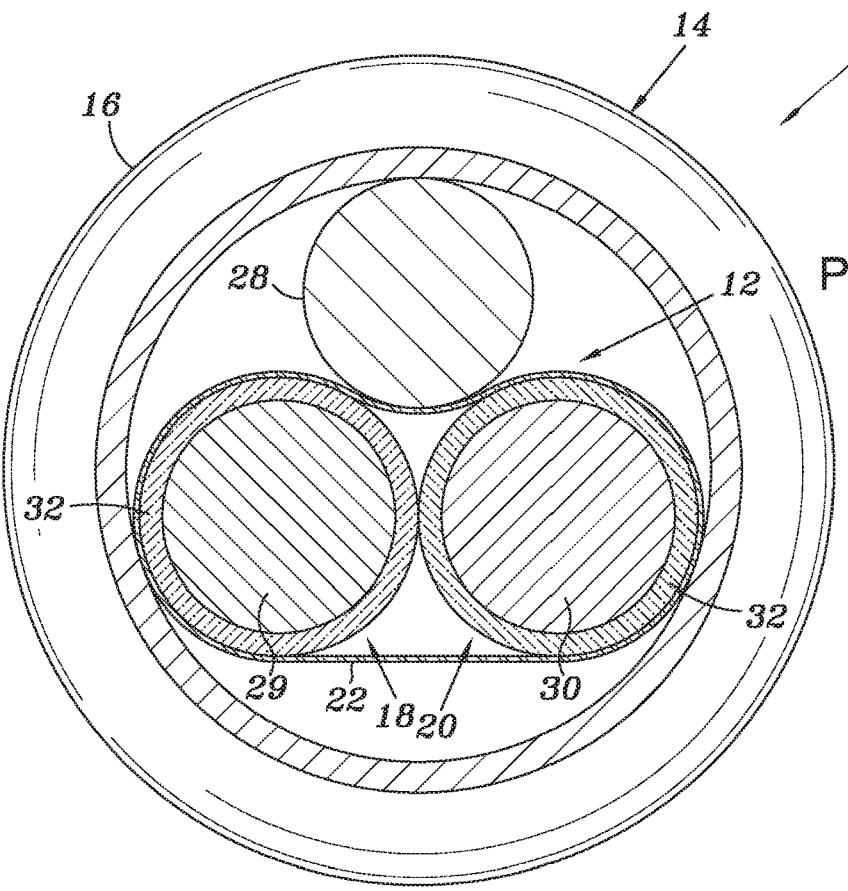
FIG. 1 is cross-sectional view of a prior art type metal-clad cable showing a conductor assembly comprising two electrically insulated conductors enclosed in a cover.

In the description which follows, like parts are marked throughout the specification and drawings with the same reference numerals, respectively. The drawings may not be to scale and certain features may be shown exaggerated in scale or in somewhat schematic form in the interest of clarity and conciseness.

Figure 2:
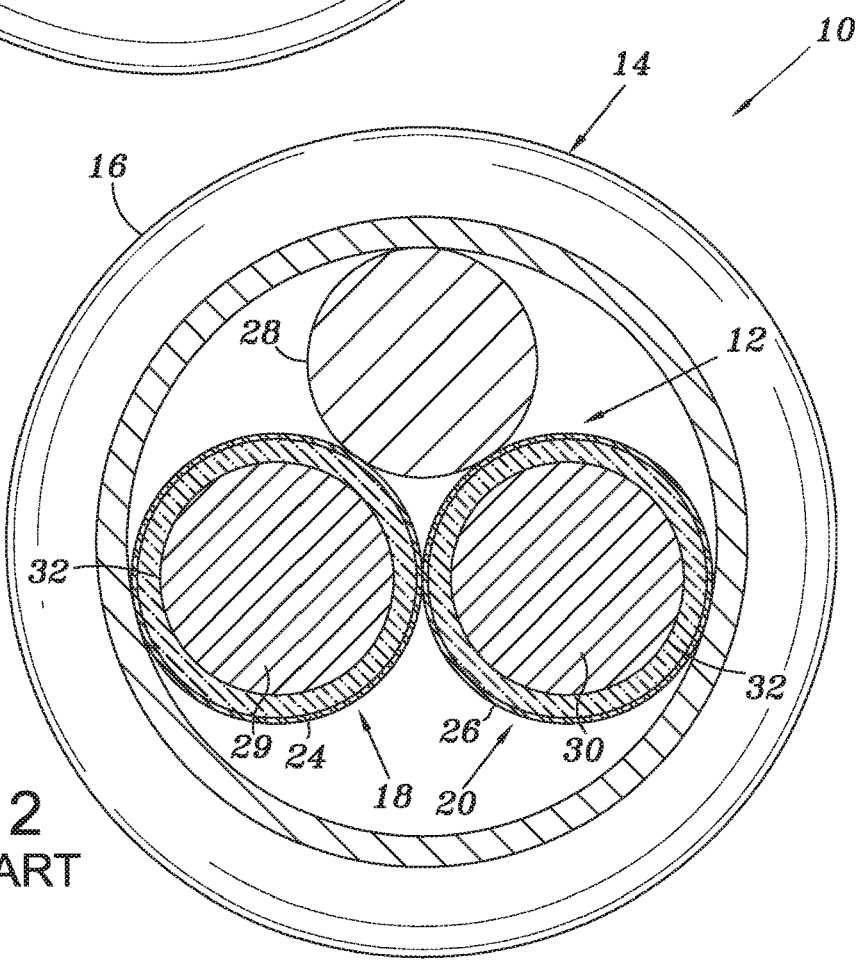
FIG. 2 is a cross-sectional view of another prior art type metal-clad cable illustrating a conductor assembly comprising two electrically insulated conductors enclosed in respective covers.

FIGS. 1 and 2 are diagrams illustrating a prior art flexible cable 10 in which a conductor assembly 12 is employed to advantage. In FIGS. 1 and 2, flexible cable 10 comprises a metal-clad armored electrical cable 14 characterized by an outer sheath or armor 16 (hereinafter referred to as sheath 16) disposed around conductor assembly 12. As illustrated in FIG. 1, conductor assembly 12 comprises two elongated and flexible insulated electrical conductors 18 and 20 disposed within a binder/cover 22 (hereinafter referred to as cover 22); however, it should be understood that each electrical conductor 18, 20 can be disposed within a respective cover 24 and 26, as illustrated in FIG. 2. A bare grounding conductor 28, such as, for example, a bare aluminum wire, is externally disposed with respect to covers 22, 24 and/or 26 and adjacent to conductor assembly 12.

As seen in FIGS. 1 and 2, electrical conductors 18 and 20 each include respective metallic wires 29 and 30 disposed within respective insulation 32 for protecting the metallic wires 29 and 30. While FIGS. 1 and 2 illustrate two conductors 18 and 20, it should be understood that cable 10 may have a greater or fewer number of conductors and a greater number of bare grounding conductors or no grounding conductors, depending on the type of cable and the particular application with which the cable 10 is to be used. In FIGS. 1 and 2, sheath 16 is formed of a metal strip having overlapping and interlocking adjacent helical convolutions, an example of which is described in U.S. Pat. No. 6,906,264, assigned to the assignee of the present invention, the disclosure of which is incorporated by reference herein; however, it should be understood that sheath 20 may be otherwise configured, such as, for example, a solid or non-interlocked metallic or non-metallic covering.

Covers 22, 24 and 26 of FIGS. 1 and 2 function to, among other things, act as a protective layer to enhance mechanical performance of cable 10. For example, covers 22, 24, 26 increase resistance to crushing and impact forces while still maintaining optimal flexibility of cable 10. The construction guidelines provided in Underwriters Laboratory Standard for Safety for Metal Clad Cables UL 1569 in effect as of the filing date of the present application (hereinafter UL 1569), the disclosure of which is incorporated herein by reference, call for a cover 22, 24, 26 for any cable assembly that contains a bare metal component such as a grounding conductor, a metal shielding tape, a drain wire or assemblies that are enclosed in an interlocked metal armor. For example, section 12.3 of UL 1569 provides for a cover composed of an elastomer-filled cloth or nylon tape that is frictioned on one or both sides. The cloth or tape can be of any necessary width, but must be at least 10 mils or 0.25 mm thick if of cloth and 6 mils or 0.15 mm if of nylon and should be helically applied. Alternatively, the covering can comprise a treated paper tape that is of any necessary width, and is at least 12 mils or 0.30 mm thick and should also be applied helically. Additionally, the covering can comprise a flat or corrugated polyethylene or terephthalate or other polyester tape or a polypropylene tape that is at least 2 mils or 0.05 mm thick.

Embodiments described herein provide an improved flexible cable 10 and method of making a flexible cable 10 having improved crush resistance comprising insulated conductors 18 and 20 each having a strength enhancer applied therein and/or thereto to enable cable 10 to be fabricated and used without cover(s) 22, 24, 26 and still maintain the mechanical performance characteristics such as those required under UL 1569. For example, as illustrated in FIG. 3, insulation 32 comprises a predetermined thickness "t" such that the advantages and functions provided by cover(s) 22, 24, 26 (i.e., increased resistance to crushing and impact forces while still maintaining optimal flexibility) are retained via insulation 32 rather than utilizing cover(s) 22, 24, 26, as illustrated in FIGS. 1 and 2.

Figure 3:
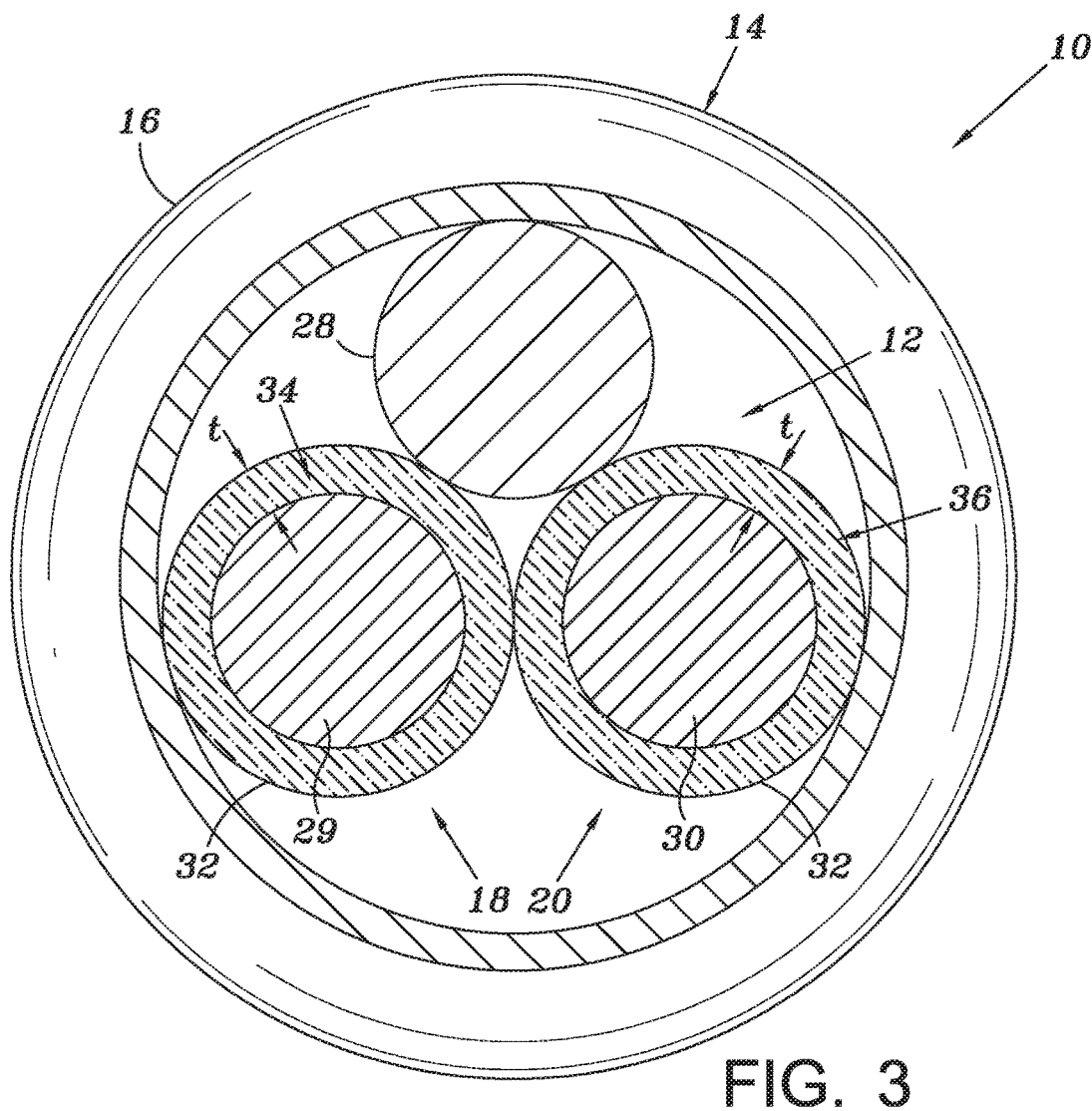
FIG. 3 is a cross sectional view of a metal-clad cable illustrating a conductor assembly comprising three electrically insulated conductors, each employing a strength enhancer to advantage.

In the embodiment illustrated in FIG. 3, insulation 32 surrounds respective wires 28 and 30. Insulation 32 contains an inner region 34 disposed generally around and in contact with wires 29 and 30 and an outer or extended region 36 integral with an inner region 34 and disposed generally along and forming the outer portion of insulation 32. Outer region 36 is sized to a predetermined thickness such that the combined inner and outer regions 34 and 36 comprise a combined thickness equal to or greater than the minimum thickness required by Underwriters Laboratory in order to maintain the performance characteristics required under UL 1569.

Preferably, the size of inner and outer regions 34 and 36 is dictated by performance criteria established by UL 1569. For example, UL 1569 describes various performance tests required of the finished cable (i.e., cable 10), one of which includes a crushing test. Inner and outer regions 34 and 36 are dimensioned based on performance criteria established in UL 1569 to determine the necessary thickness such that when cover 22, 24 and/or 26 is removed from conductor assembly 12, enhanced insulation 32 performs the functions that are otherwise performed by cover(s) 22, 24 and/or 26.

Additionally or alternatively, strength enhancer can include either a silicone oil or erucamide, which has been found to increase the crush resistance of insulation 32. In accordance with the testing subsequently described, it has been found that the crush resistance of an insulated wire sample having a silicone oil applied thereto is increased by almost 30% compared to an insulated wire sample not having a silicone oil applied thereto.

In accordance with one testing method, a pair of insulated conductors and a bare grounding conductor were wrapped within a metallic sheath. One cable contained pair of insulated conductors having a silicone oil applied thereto and the other cable contained a pair of insulated conductors without any silicone oil or strength enhancement applied thereto. The respective sizes of the conductors and cables were identical.

A force was applied to the cable assembly in accordance with UL 1569 and the force values, as listed in Tables 1 and 2 below, were determined. In particular, the cables were crushed between flat and horizontal steel plates in a compression machine. A solid steel rod was secured to the upper face of the lower steel plate and the cable was placed in between the steel plates and on top of the solid steel rod. Three separate cables were tested for each cable type (i.e., the strength enhanced and non-strength enhanced) at ten different points along the respective cables. During testing, the plates were compressed with increasing force on the cable until it was determined that contact had occurred between the conductors or between one or more of the conductors and the grounding conductor, the armor or both. Table 1 illustrates the test results without the strength enhancer. Table 2 illustrates the test results with conductors having the strength enhancer. As seen, the strength enhancer provided an increase in performance of almost 30% over the cable that did not utilize the strength enhancer.

TABLE 1

Test Data without Strength Enhancer

| Test No. | Cable 1 (Load Force) | Cable 2 (Load Force) | Cable 3 (Load Force) |
| --- | --- | --- | --- |
| 1 | 585 | 585 | 584 |
| 2 | 641 | 598 | 1669 |
| 3 | 977 | 636 | 573 |
| 4 | 1953 | 639 | 653 |
| 5 | 681 | 1101 | 1110 |
| 6 | 613 | 633 | 591 |
| 7 | 585 | 890 | 679 |
| 8 | 699 | 682 | 1256 |
| 9 | 760 | 659 | 621 |
| 10 | 569 | 1672 | 1024 |
| Average Load Force | 852.5 | 809.5 | 876 |

TABLE 2

Test Data with Strength Enhancer

| Test No. | Cable 1 (Load Force) | Cable 2 (Load Force) | Cable 3 (Load Force) |
| --- | --- | --- | --- |
| 1 | 560 | 474 | 1366 |
| 2 | 1353 | 507 | 708 |
| 3 | 1593 | 1333 | 699 |
| 4 | 1121 | 1559 | 1572 |
| 5 | 1426 | 1534 | 677 |
| 6 | 698 | 1552 | 649 |
| 7 | 1858 | 1169 | 1605 |
| 8 | 512 | 1448 | 607 |
| 9 | 1712 | 518 | 690 |
| 10 | 488 | 1291 | 1495 |
| Average Load Force | 1132.1 | 1138.5 | 1006.8 |

According to some embodiments, insulation 32 contains 0.25-0.85% of erucamide and a stearyl erucamide mixed into the conductor insulation 32. According to some embodiments, the silicone oil is a high molecular weight silicone oil. For example, the concentration, by weight, of the high molecular weight silicone oil is at least 9% by weight of the conductor insulation 32.

FIG. 3 depicts typical equipment 50 for manufacturing conductors 18, 20 in accordance with one process of the present invention. According to some embodiments, insulation 32 is of an extruded polymer material such as, for example, nylon. Equipment 50 may include a reel 52 which supplies metallic wires 29, 30 to an extruding head 54. Nylon pellets 56 are stored in tank 58, which is in flow communication with the extrusion head 54. A tank 60 with the desired strength enhancer 62 is adapted to be in flow communication with the tank 58 by way of conduit 64, thus enabling the mixing of the strength enhancer 62 with the nylon pellets 56, the mixture thereafter introduced into extruder 54. Alternatively, tank 60 may be adapted to be in fluid communication with extruder 54 by way of conduit 66, downstream from the point of entry of the nylon material, thus allowing strength enhancer 62 to mix with the nylon material 56 while in its molten state in the extruder. A cooling box 68 for cooling the extruded product is provided, and a take-up reel 70 is positioned for taking up the resulting conductor 18, 20.

Figure 4:
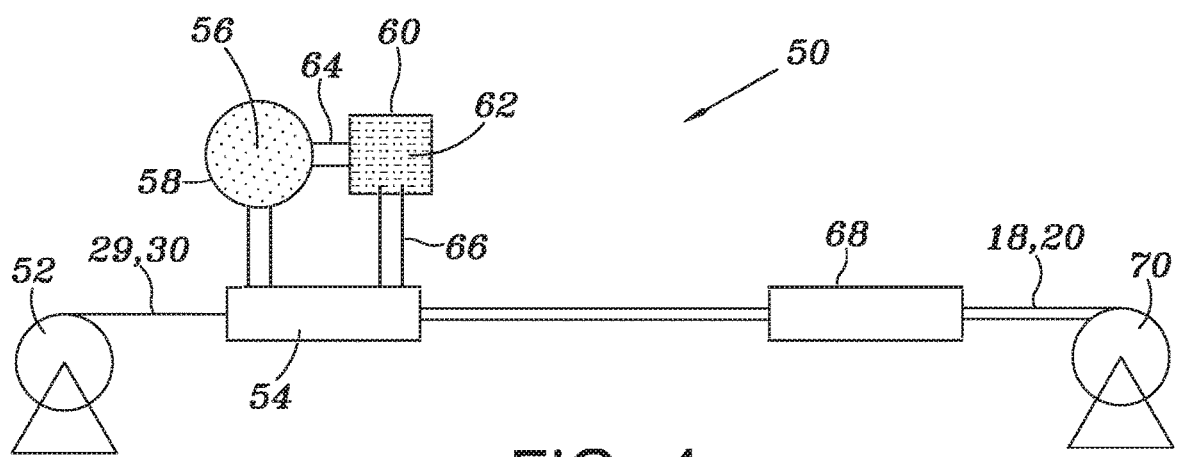
FIG. 4 is a diagram illustrating the use of typical manufacturing equipment uses in the manufacture of the insulated conductors having the strength enhancer.

As is therefore evident, the strength enhancer can be mixed with the material from which the insulation is to be extruded prior to extrusion or, alternatively, introduced into the extruding head for subsequent mixing with the molten extrusion material as the sheath is being formed. As a further alternative, the strength enhancer can be initially compounded with the polymeric material of the pellets themselves in a process upstream of that depicted in FIG. 4, thereby forming strength enhanced polymeric pellets, thus eliminating the need for tank 62 and conduits 64 and 66. Finally the strength enhancer can be applied to the insulation after the conductor has been extruded.

Polymeric materials that can be used for insulation 32 include polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like.

According to some embodiments, in addition to increasing crush resistance, it has been found that the strength enhancer can be used to increase the abrasion resistance of insulation 32. For example, cable 10 is oftentimes provided with talc powder disposed around conductors 18, 20 and beneath the binder/cover 22. In some applications, a talc powder can also be disposed the binder/cover and outer sheath, which is used to increase the abrasion resistance of conductors 18 and 20, especially during flexing of cable 10. Additionally, a Teflon wrap can be applied around each conductor (and talc, if present) prior to applying the binder/cover, in order to improve abrasion resistance. However, it has been found that applying silicone oil or erucamide also acts to, in addition to increasing crush resistance of conductor insulation 32, increase abrasion resistance.

Although specific embodiments have been described in detail, those skilled in the art will also recognize that various substitutions and modifications may be made without departing from the scope and spirit of the appended claims.

What is claimed is:

1. An electrical cable having a metallic outermost sheath, the electrical cable comprising:

a conductor assembly including at least one insulated conductor disposed within the outermost sheath, the insulated conductor consisting of an outermost surrounding layer without an additional protective covering about the outermost surrounding layer, the outermost surrounding layer having a lubricant, the outmost surrounding layer being in direct contact with the outermost sheath substantially along the length of the at least one conductor and the outermost sheath;

wherein the lubricant is included in an amount such that the combination of the outermost surrounding layer and the lubricant replacing any further protective covering between the at least one conductor and the outermost sheath such that the outermost surrounding layer maintains the crush and impact resistance as required by UL 1569 second edition, revision of Sep. 10, 1998 without the electrical cable having the further protective covering between the conductor and the outermost sheath.

2. The electrical cable of claim 1, wherein the outermost surrounding layer comprises an extruded nylon polymer.

3. The electrical cable of claim 1, wherein a strength enhancer is mixed within the outermost surrounding layer.

4. The electrical cable of claim 1, further comprising a grounding conductor disposed within and in contact with the outermost sheath.

5. The electrical cable of claim 4, wherein the grounding conductor is bare.

6. The electrical cable of claim 1, wherein the lubricant includes 0.25-0.85% of erucamide and a stearyl erucamide.

7. The electrical cable of claim 1, wherein the lubricant is formed of a high molecular weight silicone oil having a concentration by weight of at least 9% or a lubricant material including 0.25-0.85% of erucamide and a stearyl erucamide.

8. A method of increasing the crush resistance of the electrical cable of claim 1, the method comprising:

providing insulation around the conductors, wherein providing the insulation comprises mixing a lubricant and/or strength enhancer within the insulation;

enclosing the insulated conductors with the metallic outer sheath.

9. The method of claim 8, wherein mixing a strength enhancer within the insulation comprises mixing a silicone oil within the insulation.

10. The method of claim 9, further comprising mixing high molecular weight silicone oil.

11. The method of claim 10, further comprising mixing 9% by weight of the high molecular weight silicone oil within the insulation.

12. The method of claim 8, wherein mixing a strength enhancer within the insulation comprises mixing a erucamide within the insulation.

13. The method of claim 8, wherein providing insulation around the conductors comprises providing an extruded polymer insulation.

14. The method of claim 8, wherein providing the extruded polymer insulation comprises providing a nylon insulation.

15. An apparatus for protecting an electrical cable assembly including one or more insulated conductors, each insulated conductor consisting of a single outer surrounding layer, the apparatus comprising:

an outermost metallic sheath surrounding the electrical cable assembly; and the one or more insulated conductors, in which each single outer surrounding layer is in direct contact with the outermost metallic sheath substantially along the length of the electrical cable assembly and the outermost metallic sheath; and a strength enhancer formed of a high molecular weight silicone oil having a concentration by weight of at least 9% or a lubricant material including 0.25-0.85% of erucamide and a stearyl erucamide and applied in an amount such that the outermost metallic sheath and the electrical cable assembly meet the crush and impact resistance requirements in UL 1569 second edition, revision of Sep. 10, 1998 without any additional layer.

16. The apparatus of claim 15, further comprising a bare grounding conductor in direct contact with the outermost metallic sheath.

17. The apparatus of claim 15, wherein the strength enhancer is applied to the one or more insulated conductors.

18. The apparatus of claim 15, wherein the strength enhancer is mixed in the one or more insulated conductors.

* * * * *